US012694062B2

(12) United States Patent
Chauhan et al.

(10) Patent No.: US 12,694,062 B2
(45) Date of Patent: Jul. 28, 2026

(54) PROVIDING INSIGHTS ON SEMI-STRUCTURED DATA

(71) Applicant: Adobe Inc., San Jose, CA (US)

(72) Inventors: Sachin Kumar Chauhan, New Delhi (IN); Subrata Mitra, Bangalore (IN); Sunav Choudhary, Kolkata (IN); Ramasuri Narayanam, Bangalore (IN); Koyel Mukherjee, Bangalore (IN); Gautam Pratap Kowshik, El Cerrito, CA (US)

(73) Assignee: ADOBE INC., San Jose, CA (US)

( * ) Notice: Subject to any disclaimer, the term of this patent is extended or adjusted under 35 U.S.C. 154(b) by 51 days.

(21) Appl. No.: 18/342,474

(22) Filed: Jun. 27, 2023

(65) Prior Publication Data

US 2025/0005075 A1    Jan. 2, 2025

(51) Int. Cl.
*G06F 16/901* (2019.01)

(52) U.S. Cl.
CPC ................................. *G06F 16/9024* (2019.01)

(58) Field of Classification Search
CPC .................................................. G06F 16/9024
See application file for complete search history.

(56) References Cited

U.S. PATENT DOCUMENTS

| | | | | |
|---|---|---|---|---|
| 2014/0279838 A1* | 9/2014 | Tsirogiannis | ......... | G06F 16/235 707/603 |
| 2021/0150373 A1* | 5/2021 | Crouse | .................... | G06N 5/013 |
| 2021/0233295 A1* | 7/2021 | Indurkhya | ............. | G06F 16/904 |
| 2022/0124543 A1* | 4/2022 | Orhan | .................... | G06N 3/006 |
| 2022/0124560 A1* | 4/2022 | Yeh | ...................... | H04L 41/5025 |
| 2022/0237228 A1* | 7/2022 | Xu | ...................... | G06F 16/2474 |
| 2023/0162517 A1* | 5/2023 | Le | ...................... | G06V 30/1916 382/190 |

OTHER PUBLICATIONS

Gilmer, J. et al., "Neural Message Passing for Quantum Chemistry", Proceedings of the 34th International Conference on Machine Learning, 2017, vol. 70, Sydney, Australia.
Durner, D. et al., "JSON Tiles: Fast Analytics on Semi-Structured Data", SIGMOD '21, 2021, Virtual Event , China.
Yu, S. et al., "Active Sensing", Proceedings of the Twelth International Conference on Artificial Intelligence and Statistics, 2009, vol. 5, Clearwater Beach, Florida, USA.

* cited by examiner

*Primary Examiner* — Kavita Stanley
*Assistant Examiner* — Lin Lin M Htay
(74) *Attorney, Agent, or Firm* — Shook, Hardy & Bacon L.L.P.

(57)    ABSTRACT

Tabular data is received. A graph is created based on the tabular data. The graph comprises nodes corresponding to key-value pairs of the tabular data. Weights are assigned to the nodes and to edges that connect the nodes. The node and edge weights are updated using a message-passing neural network (MPNN) framework. The resulting graph is sampled based on the updated weights.

19 Claims, 5 Drawing Sheets

200

| time | id | productListItems (pLI) | Commerce |
|------|-----|------------------------|----------|
| 0:01 | A | [{SKU:[S1,S3] quantity:10}] | {segID:[A], geo:CA} |
| 0:02 | B | [{SKU:S2 quantity:30}] | {segID:[A], geo:CA} |
| 0:03 | A | [{SKU:S1 quantity:10}], [{SKU:S3 quantity:5}] | {segID:[A,B], geo:CA} |
| 0:04 | A | [{SKU:S1 quantity:10}] | {segID:[A], geo:CA} |
| 0:05 | A | [{SKU:S1 quantity:10}], [{SKU:S2 quantity:5}] | {segID:[B], geo:CA} |
| 0:06 | C | [{SKU:S2 quantity:40}] | {segID:[A], geo:CA} |

400

410
RECEIVE TABULAR DATA

420
CREATE A GRAPH BASED ON THE TABULAR DATA

430
ASSIGN WEIGHTS TO NODES AND EDGES

440
UPDATE THE WEIGHTS USING A MESSAGE-PASSING NEURAL NETWORK

450
SAMPLE THE GRAPH BASED ON THE UPDATED WEIGHTS

PROVIDING INSIGHTS ON SEMI-STRUCTURED DATA

BACKGROUND

In order to summarize or otherwise generate insights on tabular data, many computer programs "sample" the tabular data. The sampling process typically involves selecting representative rows of the tabular data and presenting information found therein. Thus, the program can provide useful information regarding the tabular data without parsing the entire dataset, which can be very large. However, tabular data often comprises cells containing multiple values (e.g., arrays or lists). Traditional data-sampling methods struggle to sample such data in a manner that is both (a) an accurate representation of the underlying data and (b) computationally efficient.

SUMMARY

Some aspects of the present technology relate to, among other things, systems and methods for sampling semi-structured data. In accordance with some aspects, tabular data is received, and a graph is created based on the tabular data. The graph's nodes represent key-value pairs of the tabular data, and the graph's edges represent adjacencies between key-value pairs in the tabular data. Initial weights are assigned to the nodes and edges based on how often they occur in the tabular data. The weights are updated using a message-passing neural network (MPNN) framework such that each node and edge weight is equal to a number of distinct paths through the graph that contain the respective node or edge. The resulting graph is sampled, and insights on the tabular data can be provided based on the sampling.

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The present technology is described in detail below with reference to the attached drawing figures, wherein.

DETAILED DESCRIPTION

Overview

Figure 1:
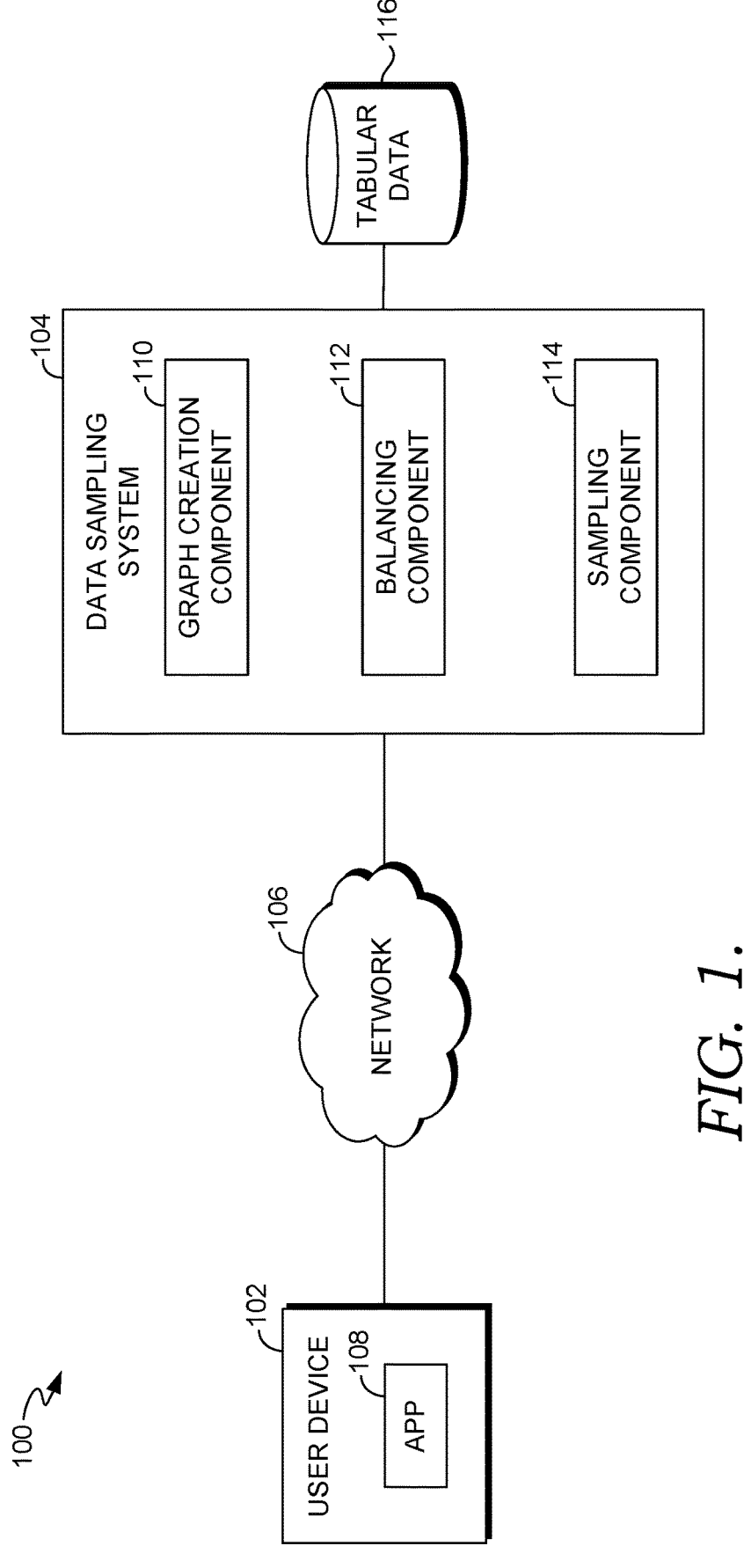
FIG. 1 is a block diagram illustrating an exemplary system in accordance with some implementations of the present disclosure.

It is often useful to summarize or otherwise extract representative information from a large tabular dataset. This can be accomplished by sampling the tabular data—i.e., selecting rows of the tabular data that represent the whole. Sampling the dataset is advantageous because the alternative, parsing every row of the dataset, is computationally infeasible when the dataset is large. Thus, many existing applications sample tabular data—e.g., for downstream tasks such as visualizing data, training machine learning models, generating data insights, creating dashboards, and processing queries.

The sampling process is more complicated when cells of the tabular data contain multiple values—e.g., in the form of arrays or lists. (Such tabular data is referred to herein as "semi-structured data.") To illustrate why semi-structured data presents a problem in the context of sampling, suppose a row of a table contains two cells: a first cell having the value {A} and a second cell having an array of three possible values {X, Y, Z}. From the vantage point of the sampling function, the row is just one row. But in reality, the row is equivalent to three distinct rows: {A} {X}, {A} {Y}, and {A} {Z}. Thus, when the table is sampled, the row will be sampled at a disproportionately low probability relative to rows that are not semi-structured. Thus, the sample will not accurately reflect the tabular data.

In order to accurately sample semi-structured data, some conventional methods "flatten" rows that comprise semi-structured data. For example, flattening the above-described row would result in three rows-one row for each of the three values in the array. This approach is particularly problematic when a row contains several cells having multiple values. For instance, if a row contains four cells having seven, eleven, three, and five values, flattening would result in (7) (11) (3) (5)=1,155 rows-even if the other cells in the row each contain only one value. Thus, for large tables, flattening is an extremely computationally expensive (and sometimes impossible) approach. What is needed is a way to sample semi-structured tabular data in a manner that is computationally efficient and paints an accurate picture of the tabular data.

Aspects of the technology described herein solve the above-identified problems by using a message-passing neural network (MPNN) framework to distribute information across a graph representation of the tabular data to be sampled. Each cell of the tabular data is represented by a node; horizontally-adjacent cells are connected by directed edges. Initial weights are assigned to the nodes and edges based on the frequencies with which they appear in their respective columns in the tabular data. As described in more detail below, the MPNN updates the weights such that each weight is equal to the number of rows in which the node/edge would appear if the table was flattened.

When the graph is sampled, the nodes and edges are selected probabilistically based on their weights. That is, a node/edge with a higher weight has a higher probability of being selected. Accordingly, the sampling process accurately reflects the underlying data without requiring a flattened dataset. The sample can be used to create a data summary (e.g., for presentation at a user interface), train a machine learning model, and more.

Aspects of the technology described herein improve the functioning of a computer in a number of ways. For example, aspects of the technology described herein significantly decrease the computational costs associated with sampling and analyzing semi-structured data—e.g., by obviating the computationally expensive data-flattening process. Accordingly, aspects of the technology described herein decrease computing resource consumption and increase the speed and efficiency with which data is sampled (and, therefore, the speed and efficiency with which data insights that depend on sampling are generated).

Example Data Sampling System

With reference now to the drawings, FIG. 1 is a block diagram illustrating an exemplary system 100 for sampling tabular data in accordance with implementations of the present disclosure. It should be understood that this and other arrangements described herein are set forth only as examples. Other arrangements and elements (e.g., machines, interfaces, functions, orders, and groupings of functions, etc.) can be used in addition to or instead of those shown, and some elements can be omitted altogether. Further, many of the elements described herein are functional entities that can be implemented as discrete or distributed components or in conjunction with other components, and in any suitable combination and location. Various functions described herein as being performed by one or more entities can be carried out by hardware, firmware, and/or software. For instance, various functions can be carried out by a processor executing instructions stored in memory.

The system 100 is an example of a suitable architecture for implementing certain aspects of the present disclosure. Among other components not shown, the system 100 includes a user device 102 and a data sampling system 104. Each of the user device 102 and data sampling system 104 shown in FIG. 1 can comprise one or more computer devices, such as the computing device 500 of FIG. 5, discussed below. As shown in FIG. 1, the user device 102 and the data sampling system 104 can communicate via a network 106, which can include, without limitation, one or more local area networks (LANs) and/or wide area networks (WANs). Such networking environments are commonplace in offices, enterprise-wide computer networks, intranets, and the Internet. It should be understood that any number of client devices and server devices can be employed within the system 100 within the scope of the present technology. Each can comprise a single device or multiple devices cooperating in a distributed environment. For instance, the data sampling system 104 can be provided by multiple server devices collectively providing the functionality of the data sampling system 104 as described herein. Additionally, other components not shown can also be included within the network environment.

The user device 102 can be a client device on the client side of operating environment 100, while the data sampling system 104 can be on the server side of operating environment 100. The data sampling system 104 can comprise server-side software designed to work in conjunction with client-side software on the user device 102 so as to implement any combination of the features and functionalities discussed in the present disclosure. For instance, the user device 102 can include an application 108 for interacting with the data sampling system 104. The application 108 can be, for instance, a web browser or a dedicated application for providing functions, such as those described herein. This division of operating environment 100 is provided to illustrate one example of a suitable environment, and there is no requirement for each implementation that any combination of the user device 102 and the data sampling system 104 remain as separate entities. While the operating environment 100 illustrates a configuration in a networked environment with a separate user device and material selection system, it should be understood that other configurations can be employed in which components are combined. For instance, in some configurations, a user device can also provide capabilities of the technology described herein.

The user device 102 can comprise any type of computing device capable of use by a user. For example, in one aspect, the user device can be the type of computing device 500 described in relation to FIG. 5 herein. By way of example and not limitation, the user device 102 can be embodied as a personal computer (PC), a laptop computer, a mobile or mobile device, a smartphone, a tablet computer, a smart watch, a wearable computer, a personal digital assistant (PDA), an MP3 player, global positioning system (GPS) or device, video player, handheld communications device, gaming device or system, entertainment system, vehicle computer system, embedded system controller, remote control, appliance, consumer electronic device, a workstation, or any combination of these delineated devices, or any other suitable device. A user can be associated with the user device 102 and can interact with the data sampling system 104 via the user device 102.

At a high level, the data sampling system 104 constructs a graph that represents tabular data. Each node of the graph represents a key-value pair of the tabular data; nodes are connected by edges if their corresponding key-value pairs are adjacent to each other in a row of the tabular data. The data sampling system 104 assigns weights to the nodes according to the frequency with which they occur in their respective columns. The data sampling system also updates these weights (and assigns weights to edges) based on (a) the number of paths from a source node to the node/edge and (b) the number of paths from the node/edge to a target node. The resulting graph is probabilistically sampled based on the weights—i.e., the higher the weight of an edge, the more likely it is to be included in the sample.

As shown in FIG. 1, the data sampling system 104 includes a graph creation component 110, a balancing component 112, and a sampling component 114. The components of the data sampling system 104 can be in addition to other components that provide further additional functions beyond the features described herein. The data sampling system 104 can be implemented using one or more server devices, one or more platforms with corresponding application programming interfaces, cloud infrastructure, and the like. While the data sampling system 104 is shown separate from the user device 102 in the configuration of FIG. 1, it should be understood that in other configurations, some or all of the functions of the data sampling system 104 can be provided on the user device 102.

In one aspect, the functions performed by components of the data sampling system 104 are associated with one or more applications, services, or routines. In particular, such applications, services, or routines can operate on one or more user devices or servers, be distributed across one or more user devices and servers, or be implemented in the cloud. Moreover, in some aspects, these components of the data sampling system 104 can be distributed across a network, including one or more servers and client devices, in the cloud, and/or can reside on a user device. Moreover, these components, functions performed by these components, or services carried out by these components can be implemented at appropriate abstraction layer(s) such as the operating system layer, application layer, hardware layer, etc., of the computing system(s). Alternatively, or in addition, the functionality of these components and/or the aspects of the technology described herein can be performed, at least in part, by one or more hardware logic components. For example, and without limitation, illustrative types of hardware logic components that can be used include field-programmable gate arrays (FPGAs), application-specific integrated circuits (ASICs), application-specific standard products (ASSPs), system-on-a-chip systems (SOCs), complex programmable logic devices (CPLDs), etc. Additionally, although functionality is described herein with regards to specific components shown in example system 100, it is contemplated that in some aspects, functionality of these components can be shared or distributed across other components.

Figure 2:
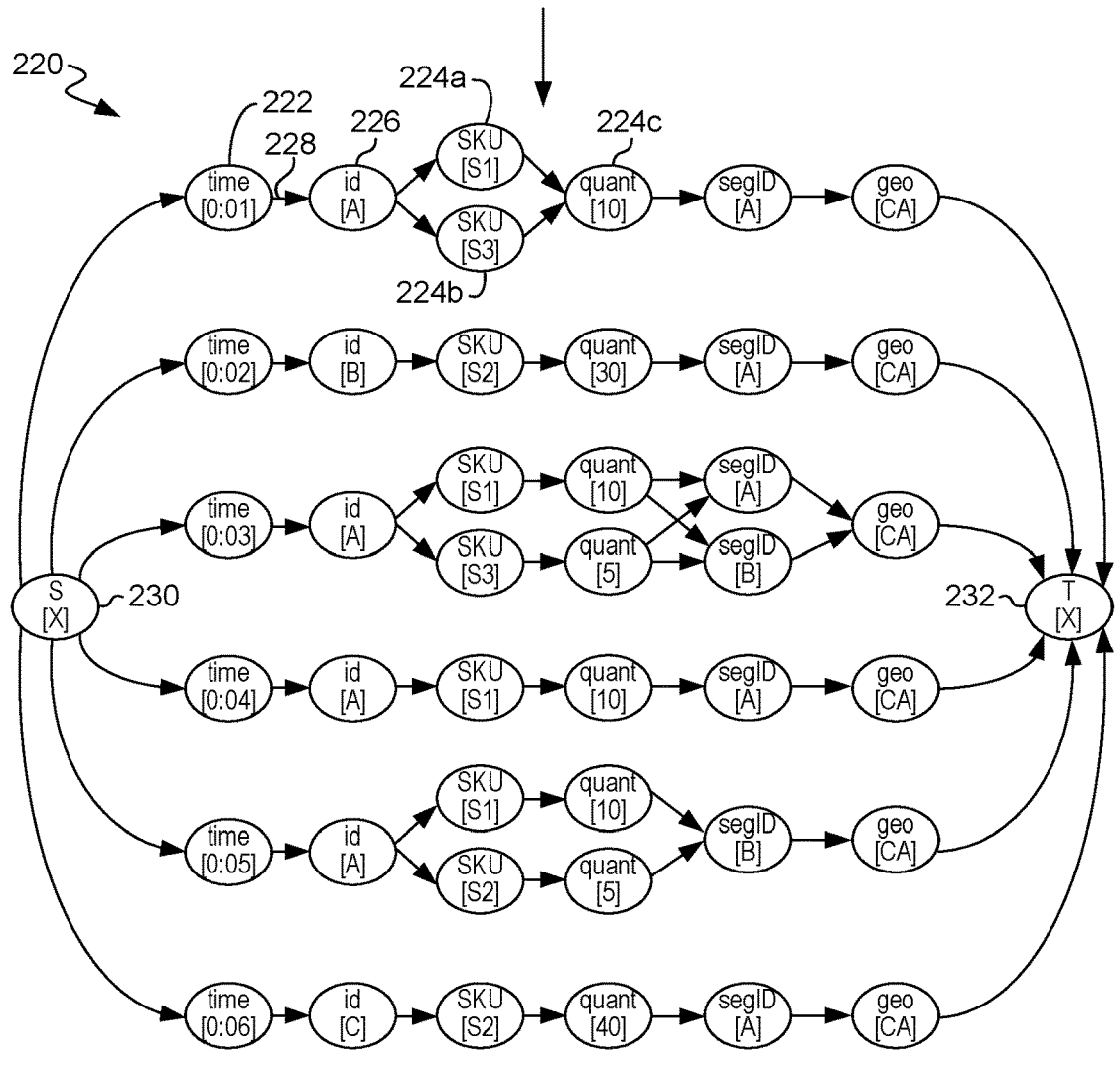
FIG. 2 is an exemplary process for creating a graph from tabular data in accordance with some implementations of the present disclosure.

The graph creation component 110 creates a graph based on tabular data. FIG. 2 illustrates an exemplary process 200 by which the graph creation component 110 can create a graph 220 from tabular data. In aspects, the graph creation component 110 receives tabular data. The tabular data can be received from a database 122 (shown in FIG. 1)—e.g., over the network 106.

The tabular data comprises one or more tables, such as table 202 shown in FIG. 2. Each table contains at least one row and at least one column. The table(s) 202 can comprise column titles 204, which are textual and/or numerical descriptions of data or values contained in cells of corresponding columns. Each cell (e.g., each intersection of a row and a column) can correspond to a key-value pair of the tabular data. Cells can comprise textual data and/or numerical data.

Tables can comprise semi-structured data. Herein, a table is referred to as being "semi-structured" (or comprising semi-structured data) if it contains at least one cell that contains more than one key-value pair. For example, if a table contains a cell containing an array of key-value pairs and the array's cardinality is greater than one, the table (and the cell) are said to be semi-structured. As another example, the table 202 of FIG. 2 is semi-structured because, among other reasons, the cell 206 contains two possible SKU values—S1 and S3—and, independently, because the cell contains both "SKU" values and a "quantity" value.

The graph creation component 110 transforms a table (e.g., 202) into a graph (e.g., 220). The graph creation component 110 can create a separate graph for each respective table of the tabular data. For a given table, the graph creation component 110 creates a node for each key-value pair of the table. For instance, the cell 208 corresponds to the key "time" and the value "0:01," so the graph creation component 110 creates a corresponding node 222. If a cell contains semi-structured data (i.e., more than one key-value pair), the graph creation component 110 creates a node for each key-value pair of the cell. For example, the cell 206 contains three key-value pairs, so the graph creation component 110 creates three corresponding nodes 224a, 224b, and 224c.

The graph creation component 110 also creates edges. Each edge connects a pair of nodes. For a given row of the table, the graph creation component 110 forms a directed edge between a pair of nodes if the nodes' corresponding key-value pairs are located in adjacent columns of a same row of the table. The directed edge can extend from a first node corresponding to a left-hand (e.g., lower-valued) column of the adjacent columns to a second node corresponding to a right-hand (e.g., higher-valued) column of the adjacent columns. And because an individual cell can comprise multiple key-value pairs (i.e., semi-structured data), cells may have multiple incoming and/or outgoing directed edges.

To illustrate, in the table 202, the cell 208 is adjacent to the cell 210 in the first row. Thus, the graph creation component 110 creates an edge 228 connecting the node 222 (which corresponds to the cell 208) to the node 226 (which corresponds to the cell 210). The directed edge extends from the node 222 to the node 226 since the cell 208 appears to the left of (e.g., before) the cell 210 in the table 202. And because the cell 206 (which is adjacent to the cell 210) contains semi-structured data, the graph creation component 110 creates multiple outgoing edges from the node 226.

The graph creation component 110 also assigns initial weights to edges. Each edge is assigned a weight based on a number of co-occurrences in the table 202 of the respective key-value pairs in the nodes connected by the edge. For example, if the table 202 contained an additional row identical to its first row (i.e., the cell 208's row), there would be two co-occurrences of the value "0:01" for the key "time" and the value "A" for the key "id." Thus, the graph creation component 110 would assign the edge 228 a weight of 2.

The graph creation component 110 also creates a source node 230 and a target node 232. The source node 230 is connected to each node that corresponds to the first (e.g., leftmost or lowest-valued) column of the table 202 by an outgoing directed edge. The target node 232 is connected to each node that corresponds to the last (e.g., rightmost or highest-valued) column of the tabular data by an incoming directed edge. This configuration results in a directed acyclic graph (DAG).

Figure 3:
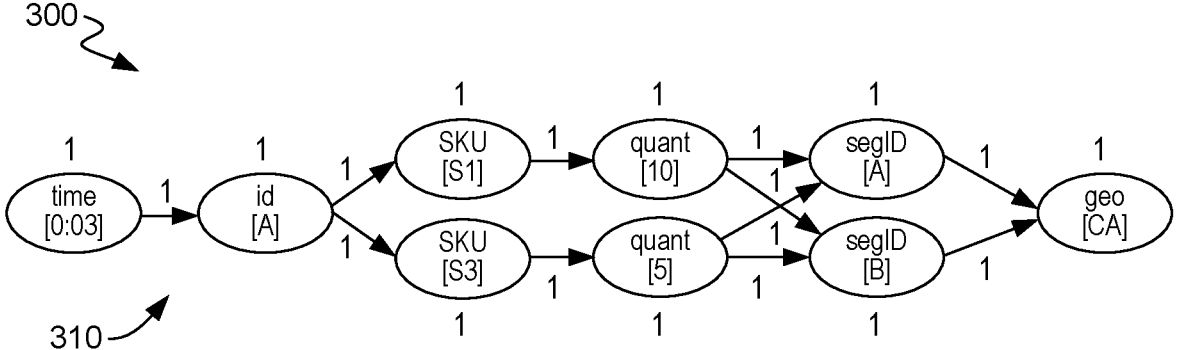
FIG. 3 is an exemplary process for assigning weights to nodes and edges of a graph in accordance with some implementations of the present disclosure.
Figure 3:
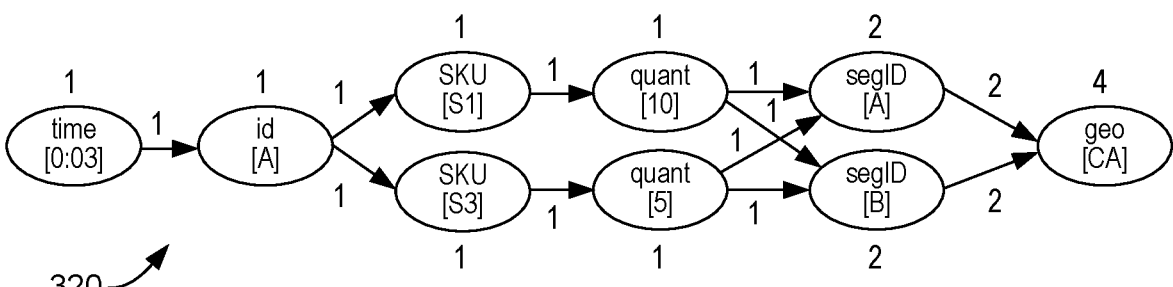
Figure 3:
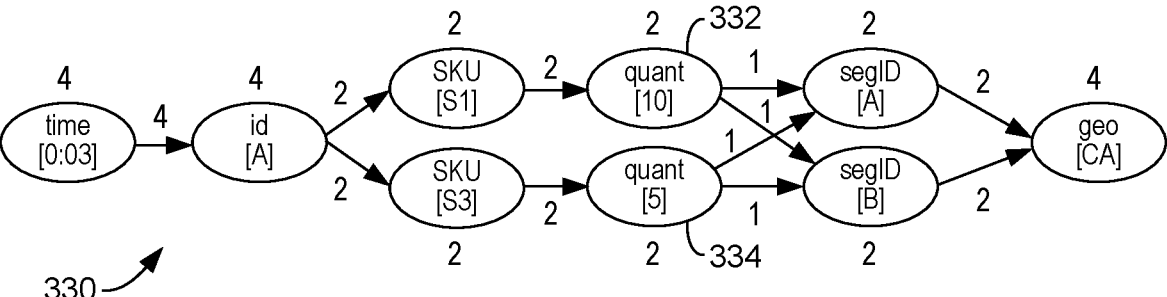

Turning now to FIG. 3, FIG. 3 shows a process 300 by which the balancing component 112 (shown in FIG. 1) balances the weights of the nodes and edges of the graph created by the graph creation component 110. At a high level, the balancing component 112 is configured to adjust the node and edge weights such that each weight reflects the number of paths from the source node to the target node that include the respective node or edge. This allows the sampling component 116 (discussed below) to accurately and meaningfully sample the graph—e.g., without under-sampling rows that contain a relatively high number of downstream branching paths, and without flattening the tabular data.

In aspects, the balancing component 112 adjusts the node and edge weights using a message-passing neural network (MPNN) framework. At a high level, MPNNs pass "messages" (e.g., numerical values) between connected nodes of a graph according to one or more predefined rules or conditions. Using an MPNN framework to "balance" node and edge weights as described herein is a more computationally efficient (e.g., GPU-optimized) way of determining the optimal weights as compared to other approaches.

The balancing component 112 receives the graph created by the graph creation component. (Only a portion of the graph 220 of FIG. 2 is shown in FIG. 3 for the sake of simplicity.) In the example shown in FIG. 3, each node and edge the graph 310 received by the balancing component 112 has an initial weight of 1. However, this is merely an example; as previously explained, nodes and/or edges may have higher initial weights in some circumstances.

The balancing component 112 operates on the graph in two phases: a forward pass and a backward pass. During the forward pass, the balancing component 112 passes information from left to right across the graph. Specifically, the balancing component 112 (a) updates each node weight such that the node weight is equal to a sum of the weights of incoming edges to the node and (b) updates each edge weight such that the edge weight is equal to the updated weight of the node from which it extends.

To illustrate, FIG. 3 shows a graph 320, which represents the graph 310 after the balancing component 112 performs the forward pass but before it performs the backward pass. Each node to the left of the nodes 322 and 324 has an incoming edge weight sum of 1, so each of these nodes retains its original weight of 1. But the nodes 322 and 324 each have two incoming edges, each with weights of 1, so the balancing component 112 updates both nodes' weights to 2. The edges extending from the nodes 322 and 324 are likewise updated to weights of 2. Finally, the node 326 has two incoming edges of weight 2, so the balancing component 112 updates the node's weight to 4.

After completing the forward pass, the balancing component 112 executes a backward pass. During the backward pass, the balancing component 112 passes information from right to left across the graph. Specifically, the balancing component 112 (a) updates each node weight such that the node weight is equal to a sum of the weights of outgoing edges from the node and (b) updates each edge weight by distributing the updated node weights proportionally to the incoming edges to the node according to the edges' weights. Thus, after the backward pass, the weight of each node (excluding the source node and target node) will be equal to (a) a first sum of the updated weights of incoming edges to the node and (b) a second sum of the updated weights of outgoing edges from the node.

To illustrate, FIG. 3 shows a graph 330, which represents the graph 320 after the balancing component 112 performs the backward pass. No changes are necessary to the nodes or edges to the right of the nodes 332 and 334. But the nodes 332 and 334 each have two outgoing edges, each with weights of 1, so the balancing component 112 updates each of the weights of the nodes 332 and 334 to 2. These weights are distributed across the remainder of the graph 330 from right to left as shown in FIG. 3.

Additionally, in some aspects, nodes of a balanced graph (e.g., a graph on which the balancing component 112 has performed forward and backward passes) can be merged to eliminate redundancies, and nodes' weights can be updated accordingly. For example, a first (e.g., leftmost) node of a second row of the balanced graph (excluding the source node) can be compared to a first node of a first row of the balanced graph. If the compared nodes (and their corresponding edges) are identical, the nodes can be merged. The comparison process continues along the respective rows until non-redundant nodes or edges are identified. The identified redundant nodes are merged into one another. That is, one of the two sets of redundant nodes is deleted, and the non-deleted nodes' weights are updated to reflect the sum of their original weights and the weights of their deleted corresponding nodes. For example, if a first node of weight 2 is determined to be redundant with a second node of weight 3 and the second node is deleted, the first node's updated weight would be 5. This process can be repeated for each row of the balanced graph. For example, the third row can be compared to the first and second rows, the fourth row can be compared to the first through third rows, and so on.

In addition, the redundancy elimination process can be repeated, but instead starting from the last (e.g., rightmost) node of each row (excluding the target node) and identifying duplicates from right to left. In other words, redundant sequences of nodes and edges can be identified and merged from right to left—in addition to (or instead of) being merged from left to right as described above. Identifying redundant sequences of nodes by starting only from the beginning and/or end of a row can be advantageous because this approach avoids information loss. For example, even if a first row's third node is identical to a second row's third node, combining the third nodes could destroy information if the first and second rows differ in structure to the left or right of their respective third nodes. However, it is contemplated that, in some cases, nodes or sequences of nodes internal to a row (e.g., not comprising a first or last node of the row) may be combined without destroying information.

The sampling component 114 (shown in FIG. 1) is generally configured to sample paths along the balanced graph 330 (e.g., from left to right, or from the source node to the target node). The sampling component 114 selects a path probabilistically based on the weights. If a node or edge has a higher weight, the sampling component 114 picks the corresponding node or edge with a proportionally higher probability. For example, if a node has two outgoing edges, a first edge having a weight of 3 and a second edge having a weight of 1, the sampling component 114 will select the first edge 75% of the time.

As a result of the operations performed by the balancing component 112, each node weight and edge weight of the graph 330 is equal to the number of distinct paths from the source node to the target node that include the respective node or edge. Put another way, each weight reflects the number of flattened rows in which the node or edge appears. Thus, the sampling component 114 is able to select representative paths from the balanced graph 330 without undertaking the computationally expensive task of flattening the tabular data.

Based on the sampling, the sampling component 114 can perform any of several post-sampling steps. For example, the sampling component 114 can provide a summary of the tabular data (e.g., the sampled data) for display at a user interface. The summary can, for example, include one or more key-value pairs from the sampled data. The summary can take the form of a dashboard, a data insight, and/or a data visualization, for example. The sampling component 114 can also use the sampled data to train one or more machine learning models and/or process queries (e.g., queries to the tabular data), for example.

Example Method

Figure 4:
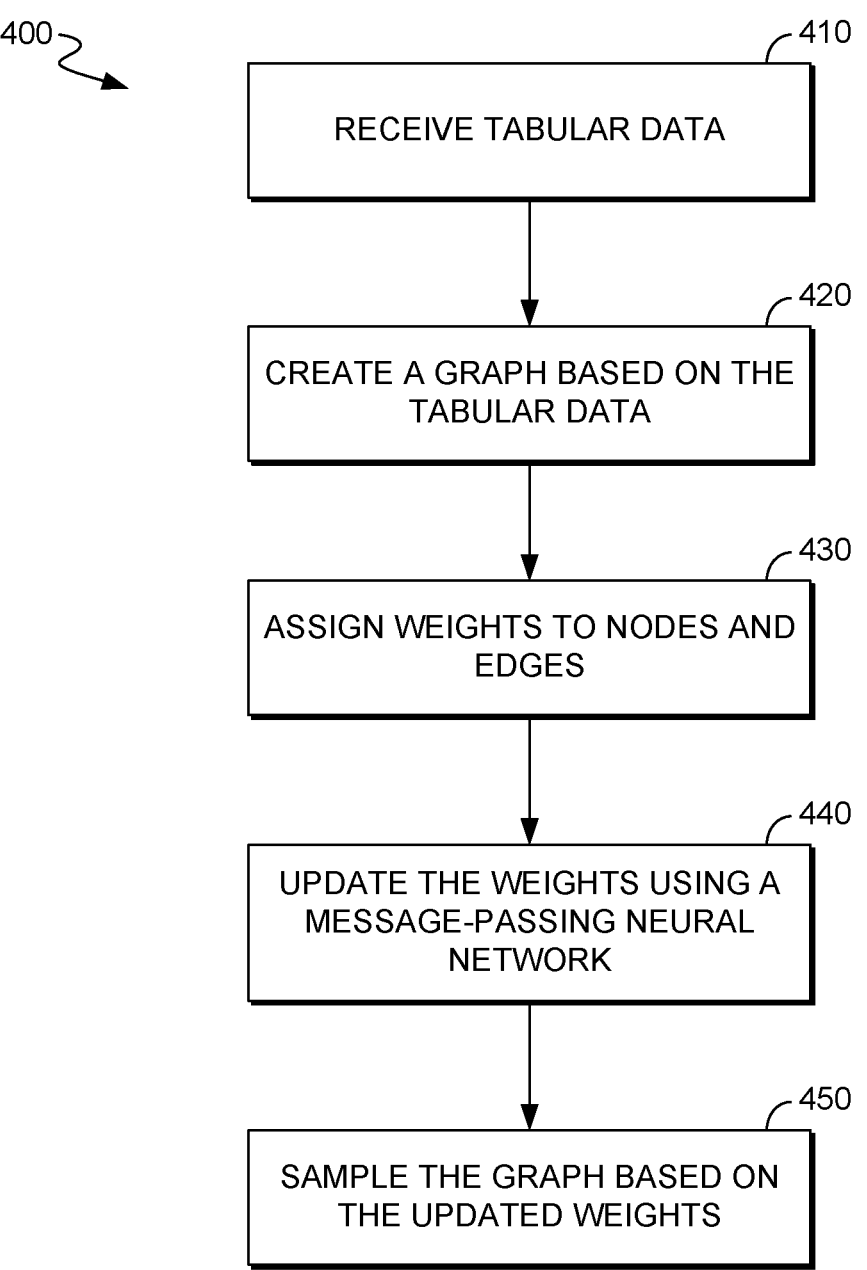
FIG. 4 is a flow diagram showing a method of sampling tabular data in accordance with some implementations of the present disclosure.

With reference now to FIG. 4, a flow diagram is provided that illustrates a method 400 for sampling semi-structured data. The method 400 can be performed, for instance, by the data sampling system 104 of FIG. 1. Each block of the method 400 and any other methods described herein comprises a computing process performed using any combination of hardware, firmware, and/or software. For instance, various functions can be carried out by a processor executing instructions stored in memory. The methods can also be embodied as computer-usable instructions stored on computer storage media. The methods can be provided by a standalone application, a service or hosted service (standalone or in combination with another hosted service), or a plug-in to another product, to name a few examples.

As shown at block 410, tabular data is received. The tabular data can be received over a network. The tabular data can comprise one or more tables.

At block 420, a graph is created based on the tabular data. The graph can comprise a plurality of nodes—e.g., one node for each key-value pair of a table. If nodes' corresponding key-value pairs are located in adjacent columns in a same row of the table, an edge can be formed between the nodes. The edge can be a directed edge. The directed edge can be oriented from a node corresponding to a lower-valued column of the table to a node corresponding to a higher-valued column of the table.

Continuing with block 420, the graph can include a source node connected to each node that corresponds to the first (e.g., leftmost or lowest-valued) column of the table by an outgoing directed edge. The graph can also include a target node connected to each node that corresponds to the last (e.g., rightmost or highest-valued) column of the tabular data by an incoming directed edge. This configuration can result in a directed acyclic graph (DAG).

At block 430, weights are assigned to nodes and/or edges. A node's initial weight can be based on a number of occurrences of a key-value pair of the node in a column of the table that corresponds to the node. An edge's initial weight can be based on a number of co-occurrences in the table of the respective key-value pairs in the nodes connected by the edge.

At block 440, the weights are updated using a message-passing neural network (MPNN). First, the weights are updated via a forward pass. During the forward pass, each node weight is updated such that the node weight is equal to a sum of the weights of incoming edges to the node. Further, each edge weight is updated such that the edge weight is equal to the updated weight of the node from which it extends. Second, the weights are updated via a backward pass. During the backward pass, each node weight is updated such that the node weight is equal to a sum of the weights of outgoing edges from the node. Further, each edge weight is updated by distributing the updated node weights proportionally to the incoming edges to the node according to the edges' weights.

At block 450, the graph is sampled based on the updated weights. The graph can be sampled by selecting one or more paths from the source node to the target node. The path taken can be determined probabilistically based on the weights of the nodes and/or edges. For example, nodes/edges with higher weights can be selected with a higher probability or frequency. The sampled path(s) can be used to provide a summary of the tabular data—e.g., at a user interface.

Exemplary Operating Environment

Figure 5:
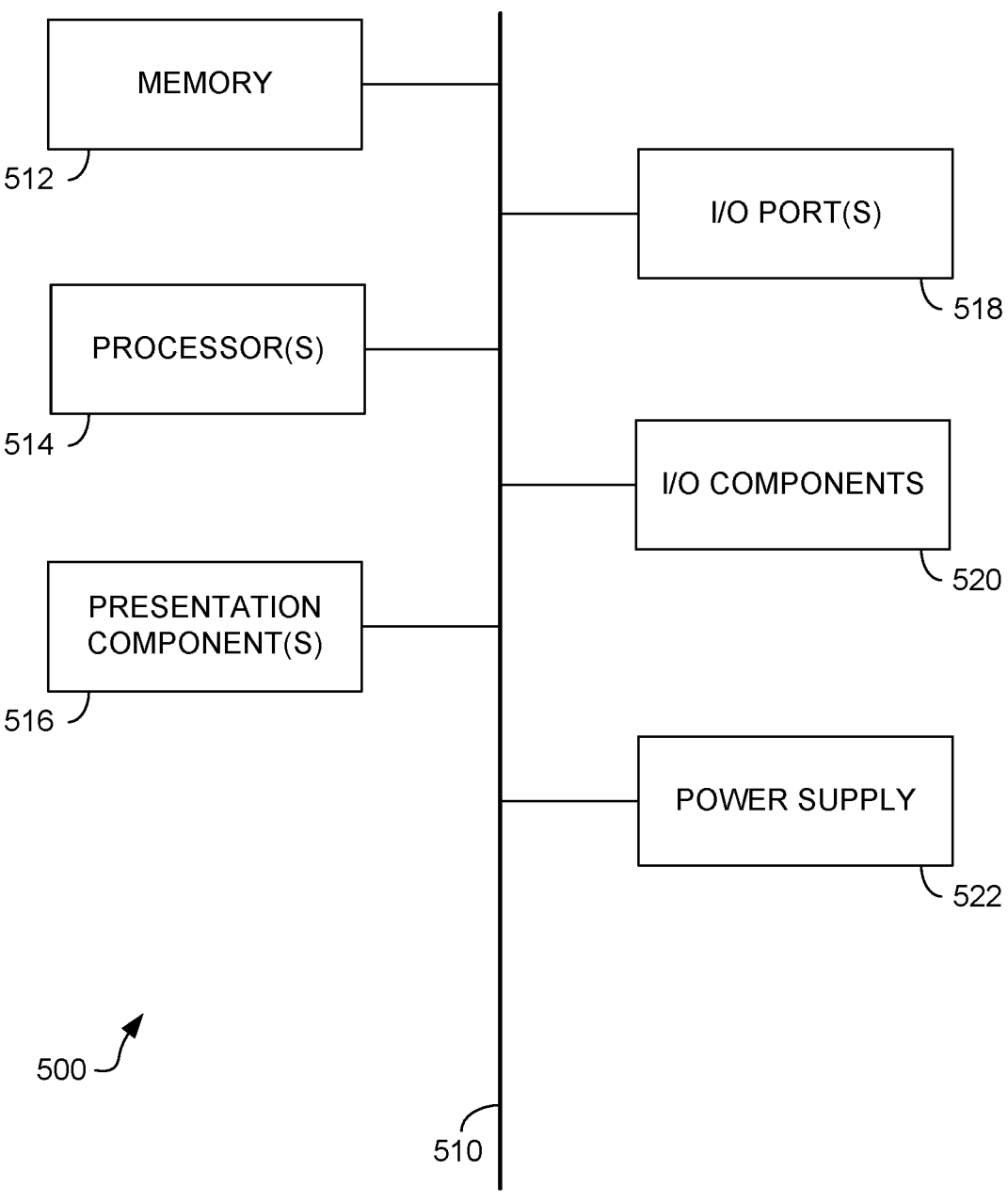
FIG. 5 is a block diagram of an exemplary computing environment suitable for use in implementations of the present disclosure.

Having described implementations of the present disclosure, an exemplary operating environment in which embodiments of the present technology can be implemented is described below in order to provide a general context for various aspects of the present disclosure. Referring to FIG. 5, an exemplary operating environment for implementing embodiments of the present technology is shown and designated generally as computing device 500. Computing device 500 is but one example of a suitable computing environment and is not intended to suggest any limitation as to the scope of use or functionality of the technology. Neither should the computing device 500 be interpreted as having any dependency or requirement relating to any one or combination of components illustrated.

The technology can be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The technology can be practiced in a variety of system configurations, including hand-held devices, consumer electronics, general-purpose computers, more specialty computing devices, etc. The technology can also be practiced in distributed computing environments where tasks are performed by remote-processing devices that are linked through a communications network.

With reference to FIG. 5, computing device 500 includes bus 510 that directly or indirectly couples the following devices: memory 512, one or more processors 514, one or more presentation components 517, input/output (I/O) ports

518, input/output components 520, and illustrative power supply 522. Bus 510 represents what can be one or more busses (such as an address bus, data bus, or combination thereof). Although the various blocks of FIG. 5 are shown with lines for the sake of clarity, in reality, delineating various components is not so clear, and metaphorically, the lines would more accurately be grey and fuzzy. For example, one can consider a presentation component such as a display device to be an I/O component. Also, processors have memory. The inventors recognize that such is the nature of the art, and reiterate that the diagram of FIG. 5 is merely illustrative of an exemplary computing device that can be used in connection with one or more embodiments of the present technology. Distinction is not made between such categories as "workstation," "server," "laptop," "hand-held device," etc., as all are contemplated within the scope of FIG. 5 and reference to "computing device."

Computing device 500 typically includes a variety of computer-readable media. Computer-readable media can be any available media that can be accessed by computing device 500 and includes both volatile and nonvolatile media, removable and non-removable media. By way of example, and not limitation, computer-readable media can comprise computer storage media and communication media. Computer storage media includes both volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 500. Computer storage media does not comprise signals per se. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 512 includes computer storage media in the form of volatile and/or nonvolatile memory. The memory can be removable, non-removable, or a combination thereof. Exemplary hardware devices include solid-state memory, hard drives, optical-disc drives, etc. Computing device 500 includes one or more processors that read data from various entities such as memory 512 or I/O components 520. Presentation component(s) 516 present data indications to a user or other device. Exemplary presentation components include a display device, speaker, printing component, vibrating component, etc.

I/O ports 518 allow computing device 500 to be logically coupled to other devices including I/O components 520, some of which can be built in. Illustrative components include a microphone, joystick, game pad, satellite dish, scanner, printer, wireless device, etc. The I/O components 520 can provide a natural user interface (NUI) that processes air gestures, voice, or other physiological inputs generated by a user. In some instance, inputs can be transmitted to an appropriate network element for further processing. A NUI can implement any combination of speech recognition, touch and stylus recognition, facial recognition, biometric recognition, gesture recognition both on screen and adjacent to the screen, air gestures, head and eye-tracking, and touch recognition associated with displays on the computing device 500. The computing device 500 can be equipped with depth cameras, such as, stereoscopic camera systems, infrared camera systems, RGB camera systems, and combinations of these for gesture detection and recognition. Additionally, the computing device 500 can be equipped with accelerometers or gyroscopes that enable detection of motion.

The present technology has been described in relation to particular embodiments, which are intended in all respects to be illustrative rather than restrictive. Alternative embodiments will become apparent to those of ordinary skill in the art to which the present technology pertains without departing from its scope.

Having identified various components utilized herein, it should be understood that any number of components and arrangements can be employed to achieve the desired functionality within the scope of the present disclosure. For example, the components in the embodiments depicted in the figures are shown with lines for the sake of conceptual clarity. Other arrangements of these and other components can also be implemented. For example, although some components are depicted as single components, many of the elements described herein can be implemented as discrete or distributed components or in conjunction with other components, and in any suitable combination and location. Some elements can be omitted altogether. Moreover, various functions described herein as being performed by one or more entities can be carried out by hardware, firmware, and/or software, as described below. For instance, various functions can be carried out by a processor executing instructions stored in memory. As such, other arrangements and elements (e.g., machines, interfaces, functions, orders, and groupings of functions) can be used in addition to or instead of those shown.

Embodiments described herein can be combined with one or more of the specifically described alternatives. In particular, an embodiment that is claimed can contain a reference, in the alternative, to more than one other embodiment. The embodiment that is claimed can specify a further limitation of the subject matter claimed.

The subject matter of embodiments of the technology is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" can be used herein to connote different elements of methods employed, the terms should not be interpreted as implying any particular order among or between various steps herein disclosed unless and except when the order of individual steps is explicitly described.

For purposes of this disclosure, the word "including" has the same broad meaning as the word "comprising," and the word "accessing" comprises "receiving," "referencing," or "retrieving." Further, the word "communicating" has the same broad meaning as the word "receiving," or "transmitting" facilitated by software or hardware-based buses, receivers, or transmitters using communication media described herein. In addition, words such as "a" and "an," unless otherwise indicated to the contrary, include the plural as well as the singular. Thus, for example, the constraint of "a feature" is satisfied where one or more features are present. Also, the term "or" includes the conjunctive, the disjunctive, and both (a or b thus includes either a or b, as well as a and b).

For purposes of a detailed discussion above, embodiments of the present technology are described with reference to a distributed computing environment; however, the distributed computing environment depicted herein is merely exemplary. Components can be configured for performing novel embodiments of embodiments, where the term "configured for" can refer to "programmed to" perform particular tasks or implement particular abstract data types using code. Further, while embodiments of the present technology can generally refer to the technical solution environment and the schematics described herein, it is understood that the techniques described can be extended to other implementation contexts.

From the foregoing, it will be seen that this technology is one well adapted to attain all the ends and objects set forth above, together with other advantages which are obvious and inherent to the system and method. It will be understood that certain features and subcombinations are of utility and can be employed without reference to other features and subcombinations. This is contemplated by and is within the scope of the claims.

We claim:

1. A computer-implemented method comprising:

receiving semi-structured tabular data comprising key-value pairs, wherein at least one cell of the semi-structured tabular data comprises at least two key-value pairs of the key-value pairs;

creating a graph based on the semi-structured tabular data, the graph comprising a plurality of nodes and a plurality of edges, wherein each node of the plurality of nodes corresponds to a corresponding key-value pair of the key-value pairs of the semi-structured tabular data;

assigning weights to the plurality of nodes and edge weights to the plurality of edges;

updating the weights of the plurality of nodes and the edge weights of the plurality of edges using a message-passing neural network (MPNN) framework by:

performing a forward pass from a source node to a target node and a backward pass from the target node to the source node such that for each node of the plurality of nodes, a corresponding updated weight of the node is equal to a first sum of updated edge weights of incoming edges to the node and a second sum of the updated edge weights of outgoing edges from the node; and based on sampling the semi-structured tabular data by sampling the graph based on the updated edge weights of the plurality of edges, causing display of a summary of the semi-structured tabular data.

2. The computer-implemented method of claim 1, wherein updating an edge weight of an edge of the plurality of edges is based on the weights assigned to a first node connected to the edge and a second node connected to the edge.

3. The computer-implemented method of claim 2, wherein assigning a weight to a node of the plurality of nodes is based on a number of occurrences of a key-value pair of the node in a column of the semi-structured tabular data that corresponds to the node.

4. The computer-implemented method of claim 3,
wherein the first node corresponds to a first key-value pair
of the semi-structured tabular data and the second node
corresponds to a second key-value pair of the semi-
structured tabular data, and wherein creating the graph further comprises assigning an
initial weight to the edge based on a number of co-
occurrences in the semi-structured tabular data of the
first key-value pair in a first column and the second
key-value pair in a second column.

5. The computer-implemented method of claim 1, further
comprising:

providing the summary of the semi-structured tabular data
for display at a user interface.

6. The computer-implemented method of claim 1,
wherein creating the graph further comprises connecting
nodes of the plurality of nodes with directed edges of the
plurality of edges based on nodes corresponding to the
key-value pairs located in a same row of the semi-structured
tabular data.

7. The computer-implemented method of claim 1,
wherein creating the graph further comprises:

creating the source node;

creating a plurality of outgoing directed edges from the
source node;

creating the target node; and creating a plurality of incoming directed edges to the
target node, wherein the graph is a directed acyclic graph (DAG).

8. The computer-implemented method of claim 7,
wherein sampling the graph further comprises selecting a
path from the source node to the target node, and wherein
selecting the path comprises selecting edges of the plurality
of edges to form the path based on the updated edge weights
of the plurality of edges.

9. One or more non-transitory computer storage media
storing computer-useable instructions that, when used by a
computing device, cause the computing device to perform
operations, the operations comprising:

receiving semi-structured tabular data comprising a plu-
rality of cells, the plurality of cells comprising a
plurality of key-value pairs, wherein at least one cell of
the plurality of cells comprising at least two key-value
pairs of the plurality of key-value pairs;

creating a graph based on the semi-structured tabular data,
the graph comprising a plurality of nodes and a plu-
rality of edges, wherein each node of the plurality of
nodes corresponds to a corresponding key-value pair
for each of the plurality of key-value pairs of the
plurality of cells of the semi-structured tabular data;

assigning weights to the plurality of nodes and edge
weights to the plurality of edges;

updating the weights of the plurality of nodes and the edge
weights of the plurality of edges using a message-
passing neural network (MPNN) framework by:

performing a forward pass to a node to compute a first
sum of the edge weights of incoming edges to the
node to update a corresponding weight of the node
based on the first sum and compute updated edge
weights of the plurality of edges based on updating
the corresponding weight of the node; and performing a backward pass from the node to compute
a second sum of the edge weights of outgoing edges
from the node to further update the corresponding
weight of the node based on the second sum and update the updated edge weights of the plurality of
edges based on further updating the corresponding
weight of the node; and based on sampling the graph based on the updated edge
weights of the plurality of edges, causing display of a
summary of the semi-structured tabular data.

10. The one or more non-transitory computer storage
media of claim 9, wherein updating an edge weight of an
edge of the plurality of edges is based on the weights
assigned to a first node connected to the edge and a second
node connected to the edge.

11. The one or more non-transitory computer storage
media of claim 9, wherein assigning a weight to a corre-
sponding node of the plurality of nodes is based on a number
of occurrences of a key-value pair of the corresponding node
in a column of the semi-structured tabular data that corre-
sponds to the corresponding node.

12. The one or more non-transitory computer storage
media of claim 11, wherein a first node corresponds to a first key-value pair
of the semi-structured tabular data and a second node
corresponds to a second key-value pair of the semi-
structured tabular data, and wherein creating the graph further comprises assigning an
initial weight to an edge based on a number of co-
occurrences in the semi-structured tabular data of the
first key-value pair in a first column and the second
key-value pair in a second column.

13. The one or more non-transitory computer storage
media of claim 9, wherein creating the graph further com-
prises connecting nodes of the plurality of nodes with
directed edges of the plurality of edges based on nodes
corresponding to key-value pairs located in a same row of
the semi-structured tabular data.

14. The one or more non-transitory computer storage
media of claim 9, wherein creating the graph further com-
prises:

creating a source node;

creating a plurality of outgoing directed edges from the
source node;

creating a target node; and creating a plurality of incoming directed edges to the
target node, wherein the graph is a directed acyclic graph (DAG), and wherein updating the weights of the plurality of nodes and
the edge weights of the plurality of edges further
comprises:

using the MPNN framework, performing the forward
pass from the source node to the target node and the
backward pass from the target node to the source
node such that for each node of the plurality of
nodes, an updated weight of the node is equal to (a)
the first sum and (b) the second sum.

15. A computer system comprising:

one or more processors; and one or more non-transitory computer storage media stor-
ing computer-useable instructions that, when used by a
computing device, cause the computing device to per-
form operations, the operations comprising:

receiving semi-structured tabular data comprising a plu-
rality of cells, the plurality of cells comprising a
plurality of key-value pairs, wherein at least one cell of
the plurality of cells comprising at least two key-value
pairs of the plurality of key-value pairs;

creating a graph based on the semi-structured tabular data,
the graph comprising a plurality of nodes and a plu-
rality of edges, wherein each node of the plurality of nodes corresponds to a corresponding key-value pair for each of the plurality of key-value pairs of the plurality of cells of the semi-structured tabular data;

assigning weights to the plurality of nodes and edge weights to the plurality of edges;

updating the weights of the plurality of nodes and the edge weights of the plurality of edges using a message-passing neural network (MPNN) framework by:

performing a forward pass from a source node to a target node and a backward pass from the target node to the source node such that for each node of the plurality of nodes, a corresponding updated weight of the node is equal to a first sum of updated edge weights of incoming edges to the node and a second sum of the updated edge weights of outgoing edges from the node; and based on sampling the semi-structured tabular data by sampling the graph based on the updated edge weights of the plurality of edges, causing display of a summary of the semi-structured tabular data.

16. The computer system of claim 15, wherein updating an edge weight of an edge of the plurality of edges is based on the weights assigned to a first node connected to the edge and a second node connected to the edge, and wherein assigning a weight to a node of the plurality of nodes is based on a number of occurrences of a key-value pair of the node in a column of the semi-structured tabular data that corresponds to the node.

17. The computer system of claim 16, wherein the first node corresponds to a first key-value pair of the semi-structured tabular data and the second node corresponds to a second key-value pair of the semi-structured tabular data, and wherein creating the graph further comprises assigning an initial weight to the edge based on a number of co-occurrences in the semi-structured tabular data of the first key-value pair in a first column and the second key-value pair in a second column.

18. The computer system of claim 15, wherein creating the graph further comprises connecting nodes of the plurality of nodes with directed edges of the plurality of edges based on nodes corresponding to key-value pairs located in a same row of the semi-structured tabular data.

19. The computer system of claim 15, wherein creating the graph further comprises:

creating the source node;

creating a plurality of outgoing directed edges from the source node;

creating the target node; and creating a plurality of incoming directed edges to the target node, and wherein the graph is a directed acyclic graph (DAG).

* * * * *